United States Patent [19]

Smith

[11] 4,170,738
[45] Oct. 9, 1979

[54] ENERGY DEVICE POWERED BY THE MOTION OF WATER BENEATH WAVES

[75] Inventor: E. Quimby Smith, Camarillo, Calif.

[73] Assignee: Q Corporation, Camarillo, Calif.

[21] Appl. No.: 861,967

[22] Filed: Dec. 19, 1977

[51] Int. Cl.² .............................................. F03B 13/12
[52] U.S. Cl. ...................................... 290/42; 290/53; 60/398; 185/30; 417/330; 405/195
[58] Field of Search ................. 60/327, 398, 499, 504, 60/506, 507; 61/20; 185/29, 30; 290/42, 43, 53, 54; 415/2, 8; 417/100, 330, 332, 333, 334; 405/195

[56] References Cited

U.S. PATENT DOCUMENTS

| 850,492 | 4/1907 | Reynolds et al. | 417/330 |
| 970,048 | 9/1910 | Harmon | 417/332 X |
| 3,928,967 | 12/1975 | Salter | 60/398 |
| 4,002,416 | 1/1977 | Axford | 60/398 |

FOREIGN PATENT DOCUMENTS

| 943960 | 10/1948 | France | 417/100 |
| 1482085 | 8/1977 | United Kingdom | 60/398 |

*Primary Examiner*—Edgar W. Geoghegan
*Attorney, Agent, or Firm*—Whittemore, Hulbert & Belknap

[57] ABSTRACT

A device for extracting both kinetic and potential energy from the motion of the water beneath waves over a considerable depth comprising a member or sail guided to reciprocate with the movement of the water. The sail is connected to and operates a power device such, for example, as an electric generator or a pump. Multiple units can be arranged in "farms" to furnish megawatts of power.

19 Claims, 15 Drawing Figures

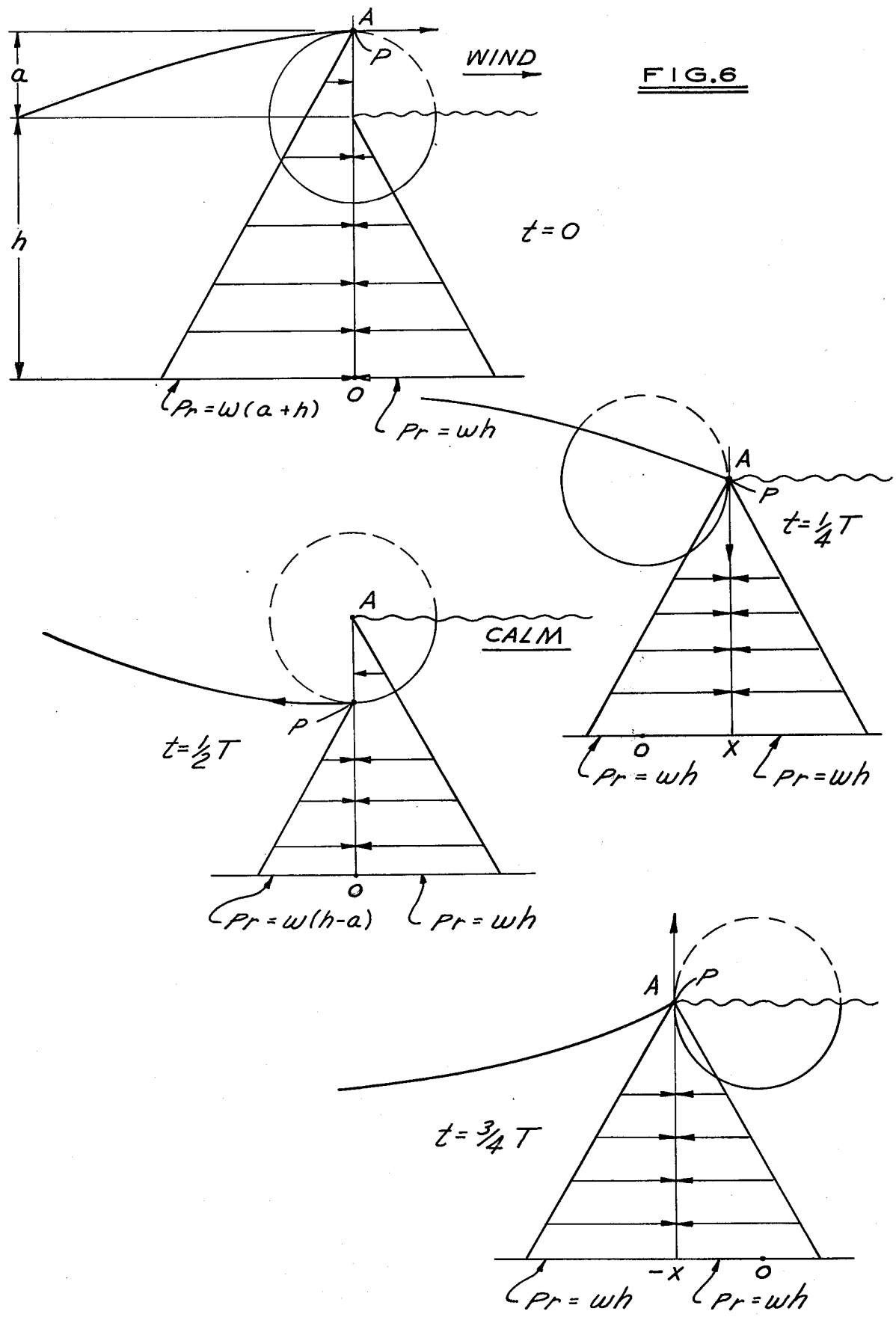

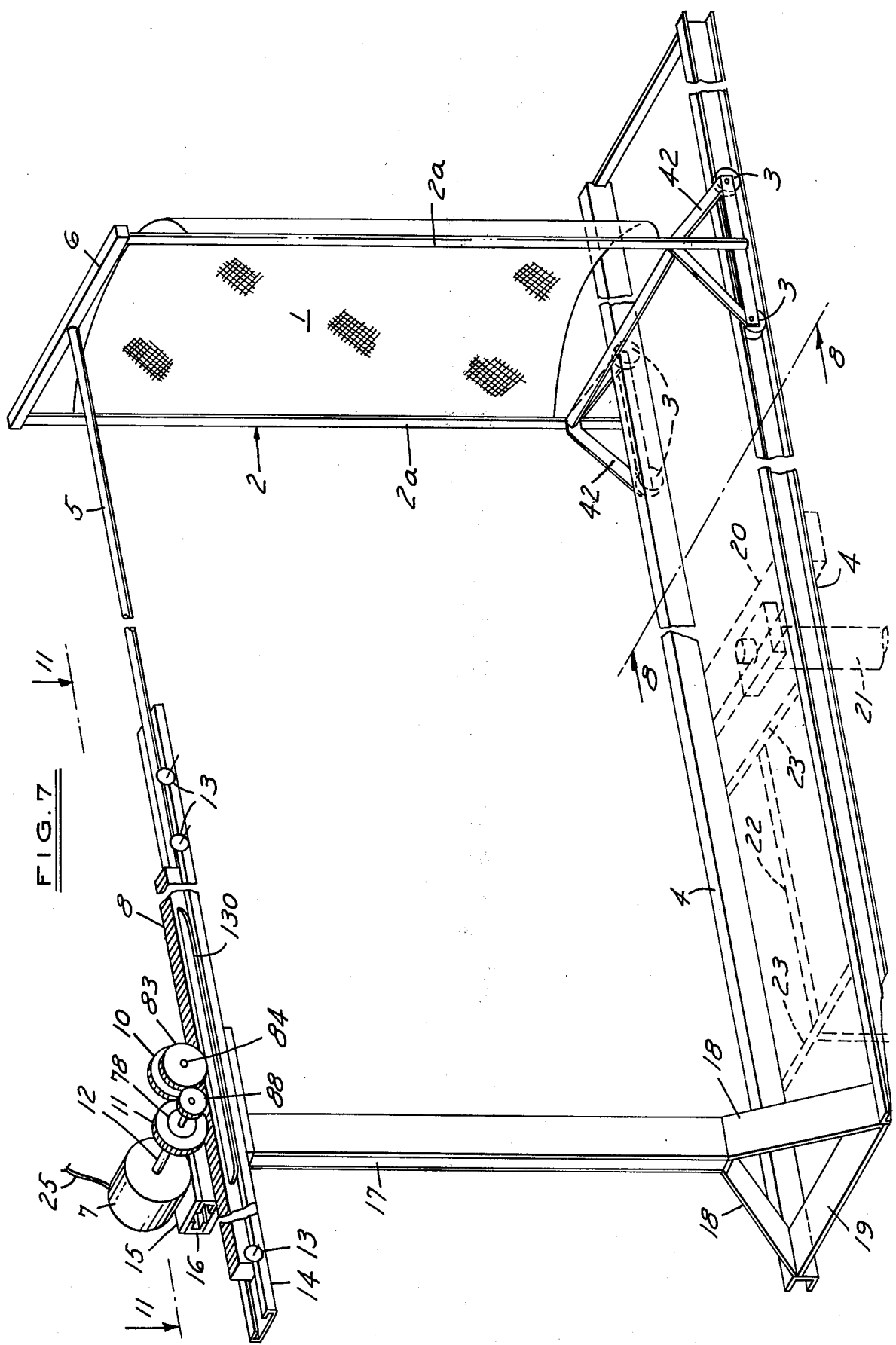

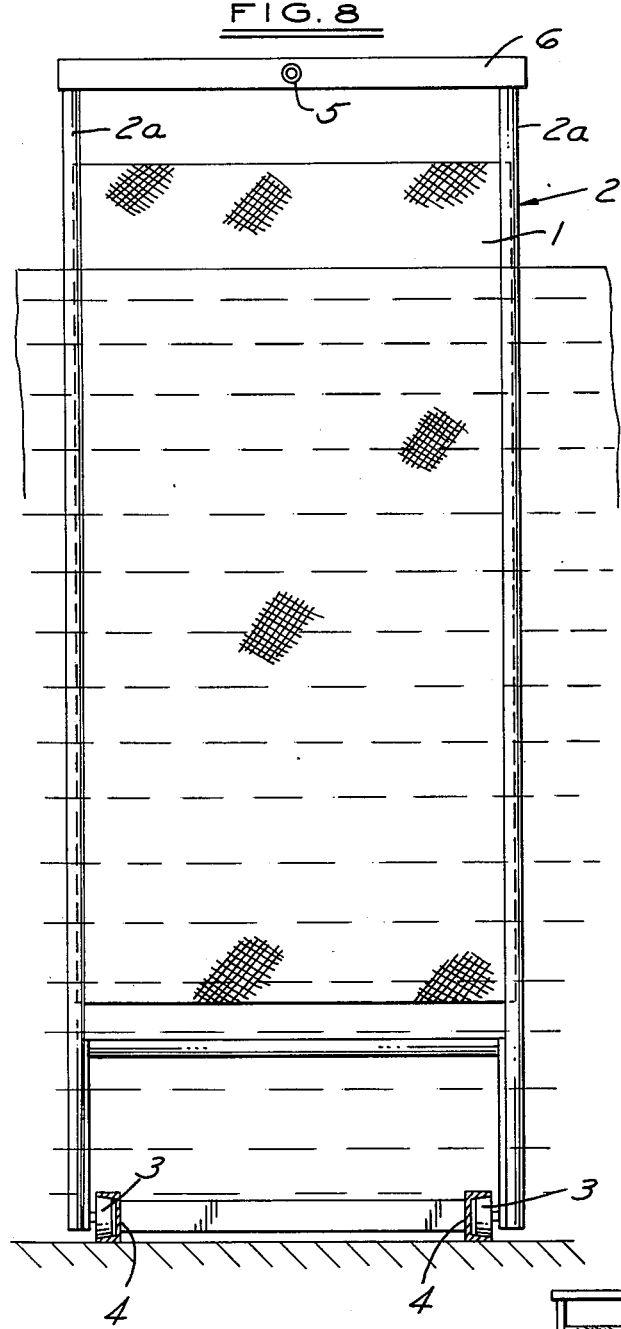
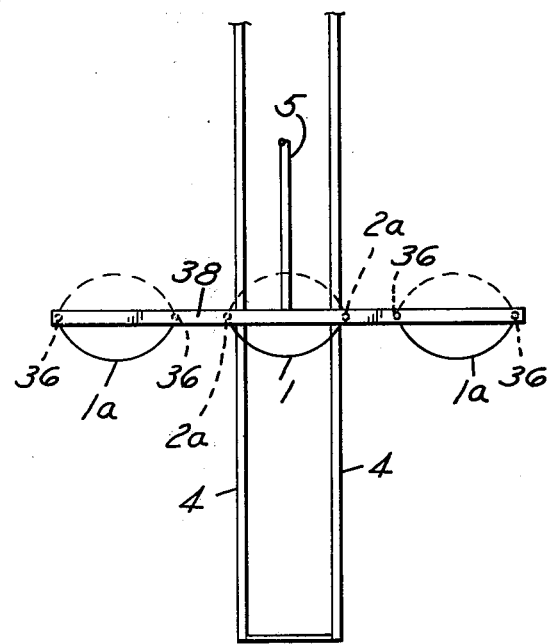
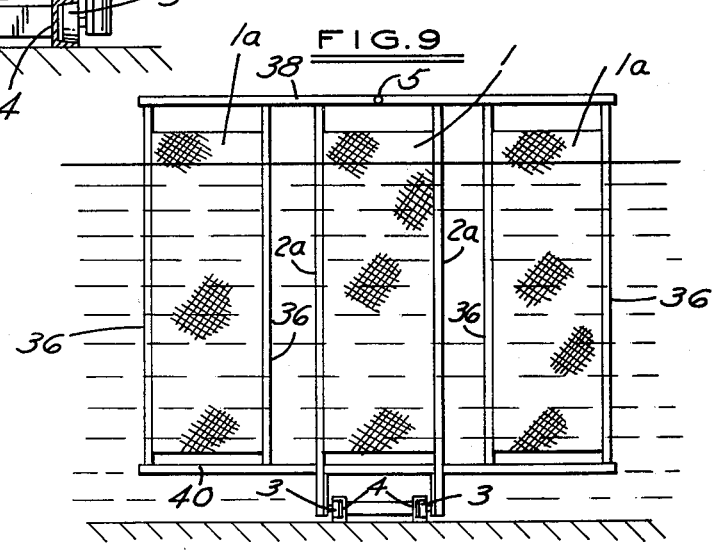

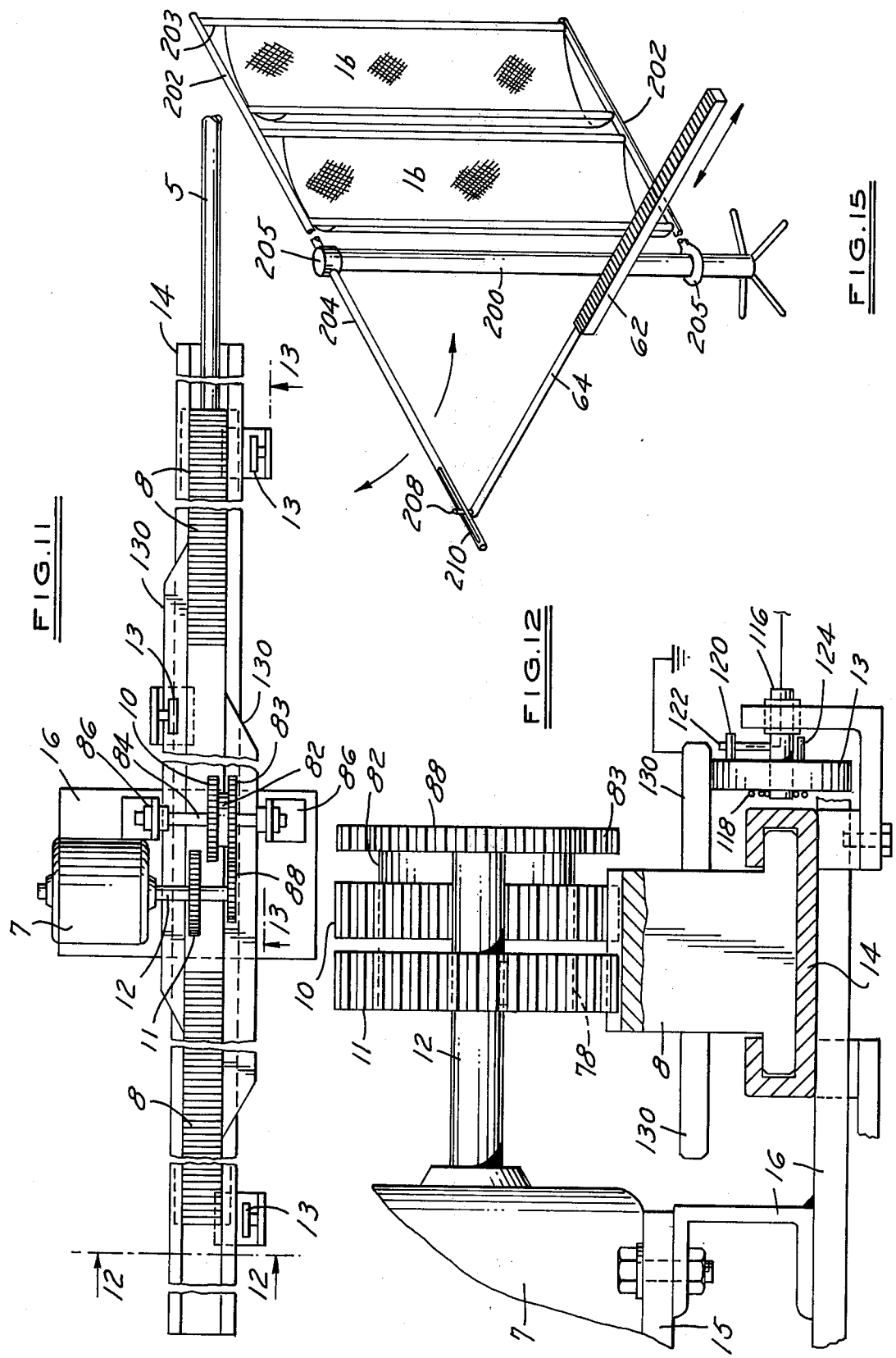

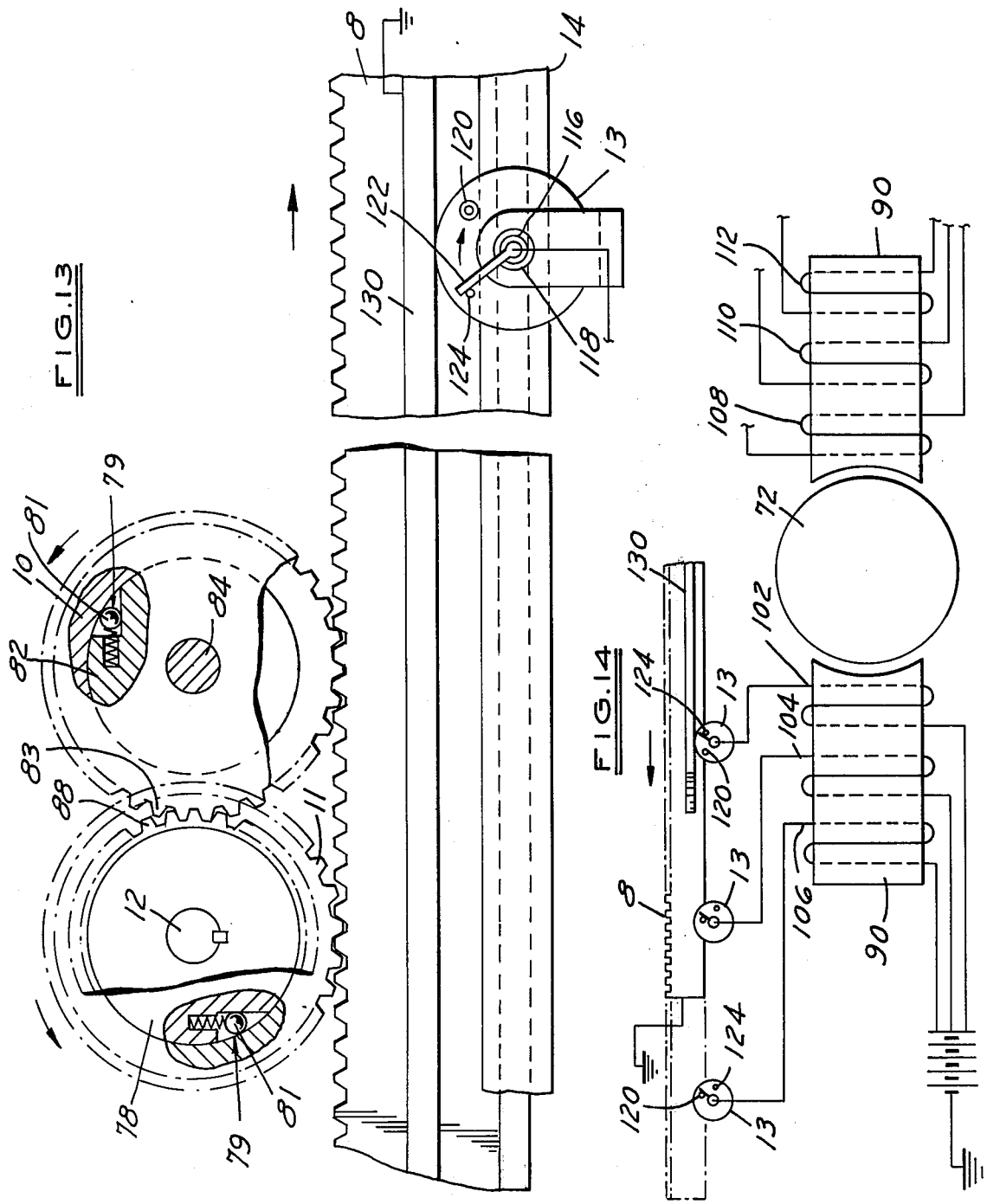

ENERGY DEVICE POWERED BY THE MOTION OF WATER BENEATH WAVES

BACKGROUND AND SUMMARY OF THE INVENTION

It is well known that there is energy in the motion of water created by wind moving over the surface. The surface profiles are referred to as waves and various float-type devices have been designed to tap the energy at the air/water interface The energy available in this region is only a portion of the total energy available, as the water particles are in motion to a considerable depth which will become evident in a later section hereof.

Wind moving over water transfers its energy to the water by setting the water in motion. This movement of the water is an essentially harmonic motion down to the ocean bottom. In deep ocean, the distance of water particle travel at a depth equal to one-half the wave length (wave length [L] is the distance from one crest to the next) is four percent of the distance of particle travel at the surface. Because energy is related to the square of the motion of water particles, over 99.8 percent of the total energy is within a depth of one-half the wave length from the surface. The amount of the wind's energy stored in the moving water beneath the waves depends primarily on the wind velocity and the length of time and the distance over which the wind has been blowing, since the wave height and wave length are determined by these conditions.

Float-type devices interacting at the water surface are relatively inefficient because they do not utilize the large amount of energy stored in the moving water beneath the wave profile. The total amount of energy stored in the water is of two forms, kinetic and potential. The principal object of this invention is to provide a device which will extract both forms of energy with high efficiency by interacting with the water beneath the waves to the depth necessary.

In accordance with a specific embodiment of the invention which is described in detail hereinafter, a member is supported in the water in a manner such that it will be moved back and forth in an oscillatory manner by the movement of the water beneath the waves. This member is sometimes referred to hereinafter as a "sail" and preferably, although not necessarily, is constructed so as to change its profile with each reversal of the direction of water movement. The mathematical descriptions of water motion below the surface of waves may be found in "Theoretical Hydrodynamics" by Milne-Thompson (Library of Congress 60-13815, pages 388-404), and "Estuary and Coastline Hydrodynamics" published by McGraw Hill (Library of Congress 65-27677, pages 24-54). Selected equations from these texts necessary to explain the movement of water beneath waves are presented in later sections hereof.

Numerous devices of the type contemplated by this invention may be grouped together in "farms" in the ocean or any large body of water to generate sufficient electrical energy to serve the needs of entire communities. Bearing in mind that the natural motion of the water is the source from which this energy output is derived, the system is non polluting and does not deplete any of our natural resources.

These and other objects of the invention will become more apparent as the description proceeds, especially when considered with the accompanying drawings, wherein:

FIG. 6 is a diagrammatic view illustrating the hydrostatic forces acting on a sail at different times during movement of the wave profile with respect thereto.

FIG. 7 is a perspective view of a device for extracting both kinetic and potential energy from the motion of water beneath waves constructed in accordance with the invention.

FIG. 8 is a view of the sail portion of the device taken on the line 8—8 in FIG. 7.

FIG. 9 is a view similar to FIG. 8 but shows a modification having a plural sail structure.

FIG. 10 is a top plan view of the structure shown in FIG. 9.

FIG. 11 is a view taken on the line 11—11 in FIG. 7 looking down on the structure.

FIG. 12 is a sectional view taken on the line 12—12 in FIG. 11.

FIG. 13 is a sectional view taken on the line 13—13 in FIG. 11.

FIG. 14 is a schematic view of a generator which may be operated by the device of FIG. 7.

FIG. 15 is a perspective view of a portion of device of modified construction for extracting kinetic and potential energy from the motion of water beneath waves.

Figure 1:
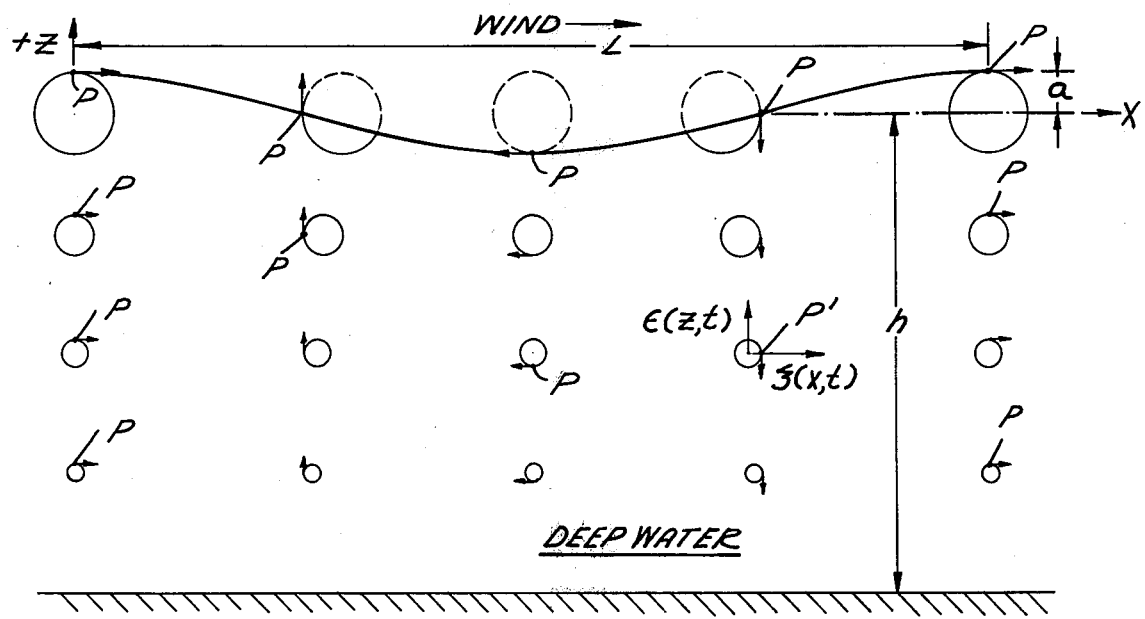
FIG. 1 is a diagrammatic view illustrating the movement of water particles beneath waves at different depths and at different points along the wave profile in deep water.
Figure 2:
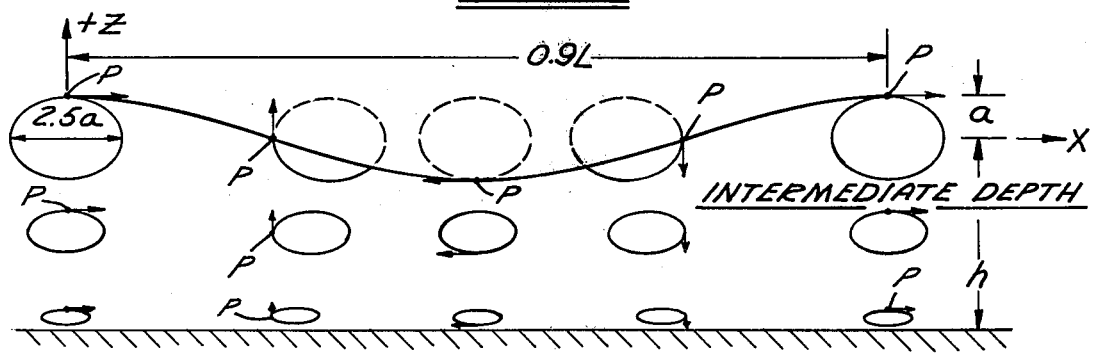
FIG. 2 is a diagrammatic view similar to FIG. 1 illustrating the movement of water particles in water of intermediate depth.
Figure 3:
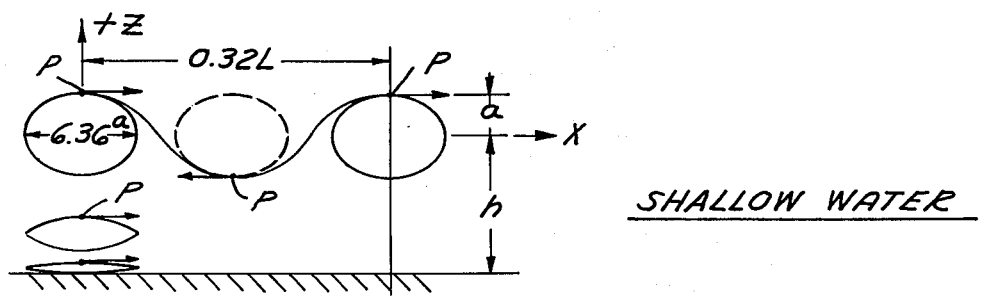
FIG. 3 is a diagrammatic view similar to FIG. 1 illustrating the movement of water particles in shallow water (not to scale).

Referring now more particularly to the drawings, and especially to FIGS. 1-3, there are shown diagrammatic views of wave motion in a body of water such as an ocean or lake, as well as the motion of water particles P beneath the waves in deep water (FIG. 1), in water of intermediate depth (FIG. 2) and in shallow water (FIG. 3).

Wave motion gives the appearance of water traveling at a steady rate in one direction. Actually it is only the wave profile which appears to move in this manner. The water beneath the waves has an essentially harmonic motion in which the water molecules or particles P move in orbital paths or streamlines. The orbital paths of the water particles P at varying distances beneath the surface are shown in deep water in FIG. 1, in water of intermediate depth in FIG. 2, and in shallow water in FIG. 3 (FIG. 3 is not to scale).

As the wave profile moves from deep ocean toward the shore the period (T), i.e., the rise and fall time of a crest to a trough to a crest, is constant. The general relation is $L = gT^2/2\pi \tanh 2\pi h/L$ where L is the distance from one crest to the next and where 'g' is the acceleration due to gravity. According to this equation the wave length will become shorter as the water decreases in depth. For shallow water $L = \sqrt{gh}\, T$ and for deep water $L = 5.12\ T^2$ with only a few percent error. These relations correspond with the observation of long swells in open ocean and the much shorter wave length observed near shore.

In deep water, that is where the depth of the water h (measured from the ocean bottom or floor to a point half way between the wave crest and the wave trough) is greater than ½ the wave length L (h/L > ½), the orbits will be nearly circular as seen in FIG. 1. In shallow water, that is where the depth of the water h is less than 1/20 of the wave length (h/L < 1/20), the orbits of the water particles will be of flattened or elliptical form as shown in FIG. 3. In water of intermediate depth, that is where the depth h is greater than 1/20 but less than ½ of the wave length (½ > h/L > 1/20), the orbits of the water particles will be elliptical as shown in FIG. 2. The elliptical orbits at intermediate depth are flattened but not as much as in shallow water.

The orbital path of any water particle, such as the particle P′ in FIG. 1, beneath the wave profile can be given by the relation $\zeta^2/A^2 + \epsilon^2/B^2 = 1$; which is the general equation for an elliptical orbit, wherein $\zeta$ and $\epsilon$ are the horizontal and vertical particle displacements respectively, and the coefficients A and B describe the flatness of the ellipse, as shown in FIGS. 1, 2 and 3. With 'a' equal to one-half the wave height (FIG. 1) and using $2\pi L = = k$ for simplicity, the expressions for A and B are $A = = [a \cosh k(h+z)]/\sinh k h$ and $B = [a \sinh k(h+z)]/\sinh k h$. With one or two percent error $A = B = ae^{kz}$ for deep water and the orbital paths become circular. The radius of the orbits will decrease from the surface to the bottom as this is the negative z direction as shown in FIGS. 1–3. For shallow water with small error, $A = a/kh$ and $B = = a(1+z/h)$. Substitution of values for this condition will show that the to and fro motion along the horizontal is greater than 'a', and that the vertical dimension of the ellipse will decrease as the bottom is approached. The importance of the greater to and fro motion in shallow and intermediate depth water will become apparent later.

FIGS. 1 to 3 illustrate the different positions of the water particles P in their orbits at different points along the wave profile. It will be understood that there are innumerable water particles moving in this same manner, although only a few are shown. At any particular point along the wave profile, all particles vertically therebelow will be in the same relative position in their orbits. Thus at the wave crest shown in the extreme left position of FIGS. 1 to 3 where $x = 0$, all of the water particles directly thereunder are at the tops of their orbits. These particles are moving horizontally to the right in the direction of wave movement as indicated by the arrows. The length of the arrows is a measure of the speed at which the particles are moving. At the wave trough in the center of FIGS. 1 to 3, where $x = = \frac{1}{2}L$, all of the water particles directly therebelow are at the bottoms of their orbits and moving horizontally to the left. The water particles at the position where $x = \frac{1}{4}L$ are moving vertically upward, and the water particles at the position where $x = \frac{3}{4}L$ are moving vertically downward. With each of these particles, there is associated a mass and a velocity vector, and hence kinetic energy which may be extracted and converted to power.

Figure 4:
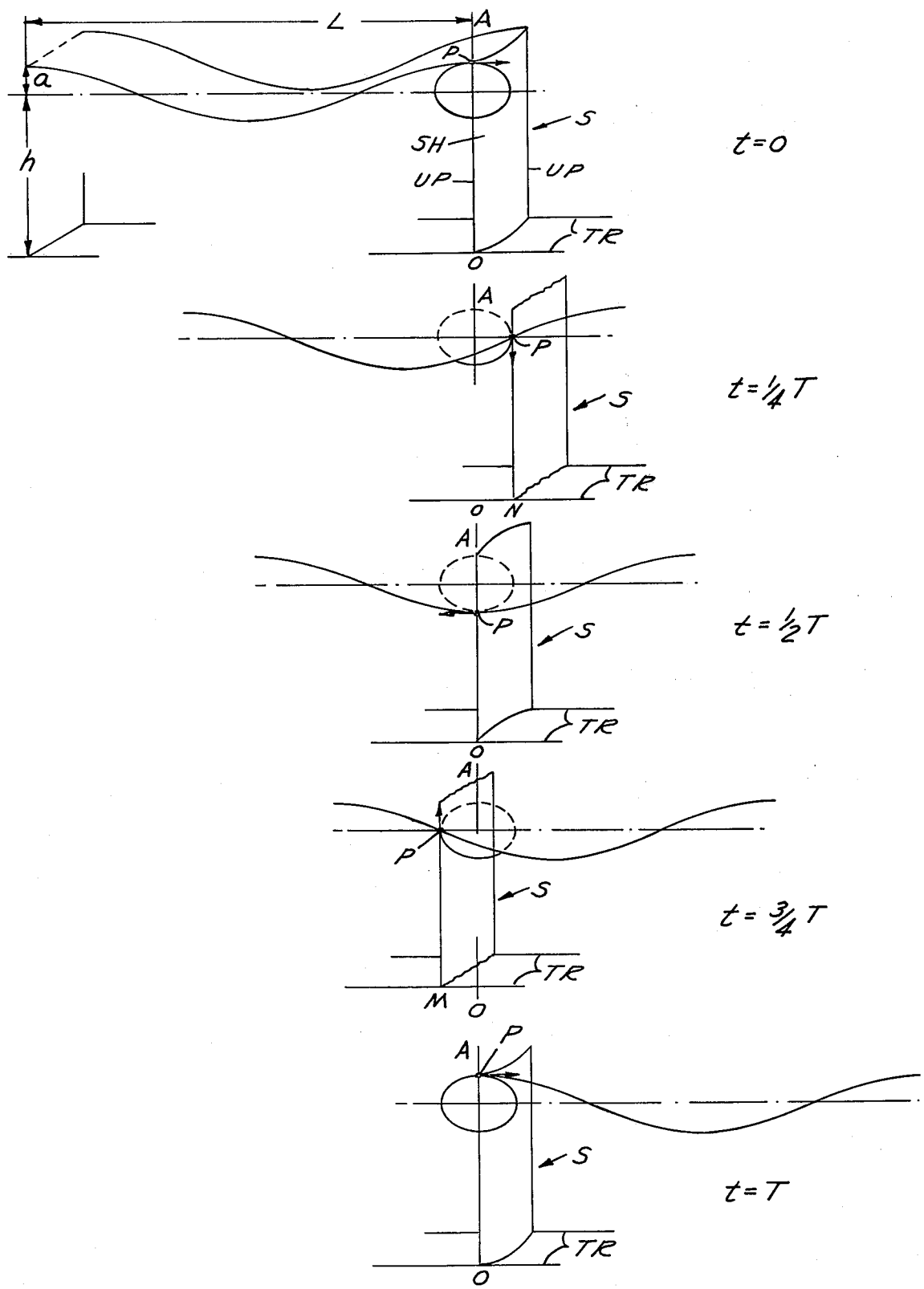
FIG. 4 is a diagrammatic view of a sail disposed upright in the water in several different positions with respect to a moving wave in water of intermediate depth.

FIG. 4 illustrates diagrammatically a sail S disposed upright in the water in several different positions with respect to a wave moving toward the right. While the sail is preferably disposed vertically, it may be disposed at other angles, if desired. FIG. 4 also shows one of the water particles P at each sail position. Spaced parallel tracks TR fixed with respect to the floor of the body of water extend in the direction of wave movement and hold the sail S upright while supporting it for back and forth movement. The sail may consist of the laterally spaced upright members UP having a sail sheet SH therebetween which may be flexible.

The sail in position $t = 0$ is shown at the crest of a wave and is illustrated in the central point O along the tracks coinciding with the ordinate AO. The water particles at this point in the wave profile are at the tops of their orbits and moving to the right, thus urging the sail to the right and causing it to move in that direction. One-fourth of a period later at position $t = \frac{1}{4}T$, the sail will be at point N along the tracks. The water particles at this point in the wave profile are moving downward so that the sail is slack. One-fourth of a period later at position $t = \frac{1}{2}T$ at the trough, the sail is back to the point O, having been moved to that position by the leftward movement of the water particles. Note that the sail is now moving to the left. One-fourth of a period later at position $t = \frac{3}{4}T$, the sail has been moved leftward to the point M along the tracks and at this point in the wave profile the water particles are moving vertically upward so the sail again is slack. One-fourth of a period still later at position $t = T$, when the next crest reaches the sail, the sail will be at point O which is identical to position $t = 0$. The sail will continue to move back and forth in this manner under the influence of the motion of the water beneath the waves.

The horizontal velocity component $u = u = -\partial\phi/\partial x$ and the vertical component is $v = -\partial\phi/\partial z$ where $\phi$ is called the velocity potential function and is expressed as $\phi = [ag \cosh k(h+z)] \cdot [\cos (kx - pt)]/[p\cosh kh]$ which satisfies Bernoulli's equations (the universally accepted principles of fluid dynamics) for the cases under consideration herein. All terms have been previously defined except $\tau$ which is $\tau = 2\pi\pi T$. The above expression is important in that it not only defines the direction of particle motion on the path, but also describes the wave profile. Note that $\phi$ is also harmonic in time according to accepted practices for defining harmonic motion, i.e., periodic in time.

Figure 5:
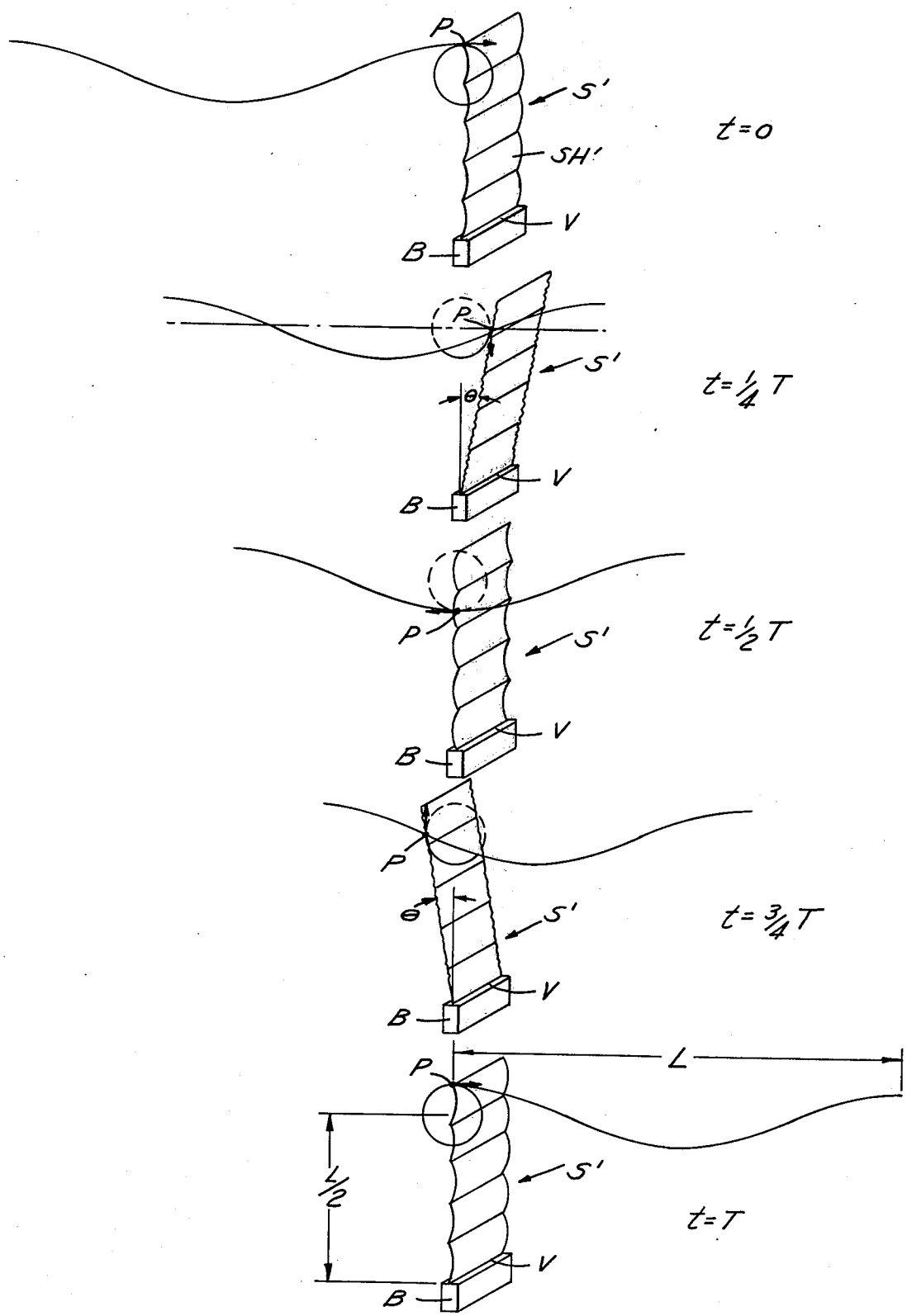
FIG. 5 is a diagrammatic view similar to FIG. 4 illustrating a sail of modified construction in several different positions with respect to a wave in deep water.

FIG. 5 is similar to FIG. 4 in that it shows diagrammatically a sail S′ disposed generally upright in the water in several different positions with respect to a wave moving toward the right, but in this instance the sail is supported for pivotal movement. As shown, the bottom of the sail is pivoted at V on a base B fixed with respect to the floor of the body of water for pivotal movement back and forth in the direction of wave movement. One of the water particles P is shown at each position.

The sail S′ moves back and forth about its pivot axis and is in its neutral vertically upright position at the wave crest (positions $t = 0$ and $t = T$), and at the wave trough (position $t = \frac{1}{2}I$). At the intermediate positions $t = \frac{1}{4}T$ and $t = \frac{3}{4}T$, the sail is shown pivoted by an amount $\theta$ in opposite directions away from the neutral position. Thus the movement of the sail S′ in FIG. 5 is comparable to that of the sail S in FIG. 4 except that it moves about a pivot. FIG. 5 illustrates a somewhat different sail construction. The sail of FIG. 5 is of a "square rigger" shape having sheets SH′ arranged one above the other and secured to the frame along their generally horizontal top and bottom edges. It will be understood that a "square rigger" sail may be used in the FIG. 4 construction, and that the plain sail of FIG. 4 may be used in FIG. 5.

FIG. 6 is a description of how the sail extracts potential energy from the to and fro motion. The equations used previously can be arranged and then integrated over a wave length and depth to determine the total amount of energy available. The total amount of energy is comprised of two components, the kinetic energy and the potential energy. The first is associated with the water movement, i.e., mass and velocity, the second is associated with the ability of a mass of water to fall a distance due to gravity. While the mathematics are complicated, the results are simple. Each of the energies is equal to $Wa^2L/4$ where W is the weight of a unit volume of water. The total energy is then $Wa^2L/2$. The water behind a dam has potential energy, i.e., the ability to produce work. Two main points are to be demonstrated in FIG. 6 relative to potential energy, as potential energy is generally extracted from waves by floats rising and falling. First, the relative velocity of water particles normal to the sail is zero as the sail is preferably non-porous. With this concept the difference in water height on each side of the sail can be interpreted in the manner of water behind a dam. Analytically, since a net force in the direction of motion occurs, the potential energy will be converted to useful energy. Secondly, in an ideal situation the device will extract all energy from an incoming wave and the water on the shoreward side will be calm, i.e., containing neither form of energy.

FIG. 6 depicts a rightward moving wave with calm water on the right side. At $t=0$ the wave crest is at a higher elevation than the water on the right side, the left side will see the maximum hydrostatic pressure equal to $W(a+h)$ for a force to the right of $(w/z)(a+h)^2$. The right side will have a maximum pressure equal to Wh acting to the left on the area h. A unit width of one foot is assumed. The net force to the right will be $(w/z)(a^2+2ah)$. At $t=\frac{1}{4}T$, the wave profile will have moved to the position shown and the forces on each side will be equal. At $t=\frac{1}{2}T$, the wave profile will be as shown, the maximum pressure on the right side will be equal to Wh while the pressure on the left side will have a maximum of $W(h-a)$. Multiplication by the respective areas yields a net force to the left which is in phase with kinetic energy being absorbed as the particles are moving leftward. At $t=\frac{3}{4}T$, the profile is as shown and the forces on each side are balanced. At $t=T$ the cycle has been completed with a return to the original position. Position $t=T$ is not shown but is identical to position $t=0$.

Water for the conditions described is generally considered incompressible, therefore the rigid sail structure as shown in FIG. 6 may be modified by substituting therefor a flexible sail which may become more attractive for the shallow water application, since it not only extracts the available kinetic and potential energy from the wave but the billowed surface presents a low drag profile to the shoreward side (when moving shoreward) which means that it will create a minimum disturbance, i.e., only a small amplitude wave profile, on the shoreward side relative to the amplitude of the incoming wave.

FIG. 7 is a diagrammatic illustration of a simple sail-type device for extracting energy from the motion of water beneath waves. A sail 1 is preferably supported vertically in the water from the air/water interface downward by the uprights 2a of frame 2. As above stated, the sail could if desired be disposed at an angle to the vertical. The frame is guided as by rollers 3 running on tracks 4 which extend in a direction perpendicular to the wave front and may be supported on or above the ocean floor. When the wave particles are moving to the right the sail will billow as shown. The sail may be a sheet of flexible material the total width of which is somewhat greater than the distance between the uprights 2a to which its edges are attached. A rod 5 is attached to frame cross piece 6 to transfer the energy from the sail and frame to any suitable power device which could, for example, be a pump but is illustrated herein as a generator 7. The leftward portion of the rod is a linear gear or rack 8 which engages gears 10 and 11 whose functions will be explained subsequently. There are many mechanical means for converting linear motion to rotational motion but it will be appreciated that the sea state or wave height will vary and thus, motion of water particles and therefore the stroke of the rod will vary. For efficiency reasons, it is desirable that the armature of the generator with shaft 12 rotate in one direction only. The purpose of the small wheels 13 attached to guide 14 for rack 8 is to maintain a desired relative position for motion of the sail which is necessary for a device which is subject to tides and currents. Their action will be explained subsequently.

The generator 7 is attached to mount 15 and supporting plate 16 and thence to vertical support 17. Members 18 and 19 rigidly attached to the rails 4 complete the supporting structure. The generator has an armature 72 (FIG. 14).

Referring now to FIGS. 11-14, the generator armature 72 has a shaft 12 extending over the top of the linear gear or rack 8. Gear 11 on the shaft meshes with the teeth of the rack 8. This gear 11 is in the form of a ring (FIG. 13) rotatably mounted on a disc 78 keyed to the generator shaft 12. A one-way clutch 79 of conventional design is provided between the disc and the gear ring so that the gear ring will drive the generator shaft when turned in one direction but not in the other. This clutch comprises a spring-pressed ball 81 wedged between tapered surfaces of the gear ring and disc. As seen in FIG. 13, when the rack 8 moves in the direction of the arrow to the right, the gear 11 is rotated counterclockwise and drives the generator shaft in a similar direction through the one-way clutch. On the other hand, reverse rotation of the gear when the rack 8 moves to the left causes the clutch 79 to unlock.

A second gear ring 10 in mesh with the rack 8 is rotatably supported on a disc 82 which in turn is rotatably mounted upon a shaft 84 mounted to the support 16 by the brackets 86 (FIG. 11). As best seen in FIG. 13, the disc 82 has a toothed portion 83 in mesh with a gear 88 keyed to the generator shaft 12. There is a second one-way clutch connection 79 between the gear ring 10 and the disc 82 such that rotation of the gear ring in one direction will drive the disc 82 but rotation in the opposite direction will permit the gear ring to rotate freely on the disc. As seen in FIG. 13, when the rack 8 moves to the left, clutch 79 between gear ring 10 and disc 82 will lock, driving disc 82 clockwise. The toothed portion 83 of disc 82 drives gear 88 and generator shaft 12 counterclockwise which is the same direction of rotation produced by rightward rack movement through gear ring 11. Hence the generator shaft is turned in the same direction by both directions of rack movement. The generator 7 is shown in FIG. 7 as having a cable 25 by means of which electricity generated thereby can be transmitted to a power distribution center or directly to an electric motor or other device to operate the same.

When the apparatus of FIG. 7 is placed in the water and oriented with tracks 4 parallel to the direction of movement of the water beneath the waves, the sail 1 will be moved back and forth by the water. When the water particles are moving to the right, they push the sail to the right. When they move to the left, they push the sail to the left. The rod 5 is similarly moved right and left, driving the generator rotor in the same direction of rotation during both the in and the out movement of the rack through the gearing provided. The generator may be of standard construction operating in a field provided by the permanent magnet 90 (FIG. 14) to generate electricity.

The vertical height of the sheet portion of the sail may be such that it extends above the crest of the waves and down sufficiently far to tap much if not most of the energy in the moving water. FIG. 8 illustrates the upper portion of the sail projecting above the surface of the water. The rack and generator structure may be disposed above the water surface and clear of the water, although this structure can and will operate effectively under water when designed for the environment, i.e., hermetically sealed.

The apparatus of FIG. 7 may be supported with the rails in fixed position, or it may be articulated or supported so as to permit the orientation of the sail to be changed as the direction of water movement changes. FIG. 7 shows in dotted lines one means for changing the orientation of the apparatus of FIG. 7 although other mechanical and/or electronic devices may be designed. As shown, a plate 20 is secured to and supports rails 4, and a post 21 anchored on or above the sea floor pivotally supports the plate 20 for movement about a vertical axis. The upright rudder 22 secured to the rails 4 by braces 23 extends parallel to rails 4 and causes the device to turn on the post 21 automatically in response to changes in the direction of water movement so that the rails 4 of the apparatus at all times will be parallel to the direction of movement of the water beneath the waves and its sail perpendicular thereto. It will be understood that suitable electronic and/or mechanical devices may be used to orient the previously described configurations of said structures.

Although the movement of the sail structure back and forth occurs generally within the same limits of movement, the sail central point (average position) at times has a tendency to move away either shoreward or out to sea, depending upon the general movement of the total body of water which may occur as a result of tidal action or current, for example. Also, variations will naturally occur in wave height from one wave to the next. Means are therefore provided such that the sail will have nearly the same central position for each cycle even though the motion of the sail may be greater in either direction from one cycle to the next. In the present instance, this function is accomplished by adding generator coils to increase the field when the sail structure moves beyond acceptable limits. Generally, means for accomplishing this function are categorized as position servo systems.

Referring to FIG. 14 which is a schematic view of the relation between the rack and generator, the generator armature 72 is shown turning in a field provided by the permanent magnet structure 90. The field, while necessary for the generation of electricity, nevertheless imposes a certain resistance on the ability of the armature to turn. This resistance can be increased by energizing one or more of the coils 102, 104, 106, 108, 110 or 112 depending upon the amount and direction of the average motion from the neutral position. Three such coils are shown at the left in FIG. 14 and three similar coils, although not illustrated completely, are provided at the right. The circuit of each coil in FIG. 14 includes a contact roller 13. As seen in FIG. 13, each roller 13 is rotatably mounted on a shaft 116 but biased by a torsion spring 118 to bring its insulated post 120 into contact with the contact arm 122 rigid with and projecting radially from shaft 116. The roller has a terminal 124 in circumferentially spaced relation from the insulated post.

When the sail structure position moves too far to the left in relation to the central position, it causes the elongated cam 130 to frictionally engage the periphery of the first roller contact 13. The roller contact is turned counterclockwise to bring its terminal 124 into contact with the arm 122, thereby closing the circuit of coil 102 through the axle shaft 116, the arm 122, terminal 124, roller 114 and the grounded rack cam 130. Continued movement of the rack 8 to the left allows the roller to skid on the cam and to maintain the electrical contact closing the circuit of the coil. However, when the rack reverses and moves to the right, frictional contact with the cam turns the roller 13 clockwise into contact with the insulated terminal 120 to break the circuit. The roller 114 skids on the cam until the cam moves out of engagement with it. During the time that coil 102 is energized, additional field current is applied to resist rotation of the armature 72 and thereby increasing the resisting force on the sail and limiting the maximum displacement of the sail structure. This coil is, however, deenergized immediately upon reversal of the sail structure.

Should the sail structure continue leftward despite the added resistance of field current in the coil 102, additional coils 104 and 106 may be provided to add still more field current to limit the displacement of the sail.

As noted above, similar coils including roller contacts 13, etc., are provided to limit motion of the sail in the opposite direction.

For the sake of convenience and if desired, the rollers 13 may be distributed on both sides of the rack 8, in which event cams 130 to operate the rollers are provided on both sides of the rack.

It will be appreciated that increasing the electrical field strength increases the electrical power output of the generator. This invention will therefore capture a maximum amount of energy available in water in varying sea states.

Although FIG. 5 illustrates the deep water case, wherein the sail oscillates about a horizontal pivot axis at the bottom of the sail, this could also be used at intermediate depth. Nature can provide a simple displacement servo by the following embodiment. The masts or frame members shown supporting the sail may be hollow and sealed and thus buoyant. In this configuration, a net buoyant force will always act vertically on the mast. This force, since it is always vertical, will create a restoring torque to the vertical whether the sail is tilted left or right. The torque is conservative in the sense of physics i.e. non-dissipative and thus does not decrease the power available to the generator. Should a larger torque be desired, it may be obtained by rigidly attaching a streamlined buoyant to the mast at a point where submergence is assured, but a high torque is obtained.

FIGS. 9 and 10 show a modification of the sail structure. Comparing FIGS. 8 and 9 it will be seen that the sail structure of FIG. 9 differs from that of FIG. 8 essentially only in the provision of additional sail sheets in side-by-side relation. Two additional sail sheets 1a are shown in FIGS. 9 and 10 supported on either side of the central sail structure by lateral extensions 38 and 40 of the top and bottom frame members and by additional vertical frame members 36. Obviously, any number of additional sail sheets could be provided. The provision of additional sail sheets allows the sail structure to interact with more of the moving water and thus take advantage of a higher percentage of the energy present in the wave motion. The apparatus of FIGS. 9 and 10 can be made self-orienting, if desired, in the same manner as the apparatus of FIG. 7.

FIG. 15 shows a further embodiment in which the sail structure is mounted on an upright post 200 anchored on or above the sea floor. The frame structure has horizontal and vertical frame members 202 and 203, the horizontal members being connected to rings 205 pivoted to the post 200 so that the frame structure may turn about the axis of the post. Any number of said sheets may be employed and in this instance, two sail sheets 1b are provided side by side in upright position which will be responsive to the movement of the water in a manner similar to that previously described. The frame structure has an arm 204 extending from the post 200 in the diametrically opposite direction from the sail structure but rigidly secured thereto so as to turn as a unit therewith. This arm 204 is connected to rod 64 by a pin 208 on rod 64 in slot 210 in the end of arm 204. The rod 64 is connected to a rack 62 which may be identical to the rack 8 in FIG. 7 and may operate and have the same relationship to the generator structure 7 shown in FIG. 7 although not further illustrated in FIG. 15. The pin and slot connection 208,210 is necessary to prevent binding which might otherwise result due to the fact that the rack 62 is guided for straight line reciprocation. It is important to note that the central position for FIG. 15 can be varied to account for changes in the direction of the water movement. Within limits, the device of FIG. 15 is self-orienting. This assures maximum capture and transfer of energy.

As stated previously, devices for extracting energy of the types previously described may be grouped together in multiples arranged in "farms" to furnish megawatts of power sufficient to meet the needs of an entire city. As an example, per the previously stated equations, one mile of coastline with eight foot crest to trough waves with a period of ten seconds has 187 megawatts of power available. Further, it should be appreciated that waves in both shallow and intermediate depth water near the shore contain the same amount of energy as those in deep ocean water if the wave height and period are the same in all places. Thus, material and construction costs (or capital investment costs) should be less per kilowatt in the near shore case. It will also be understood that the electricity generated by any of the devices described could be transmitted by cable to a power distribution center or could be transmitted directly to an electric motor or other device to operate the same.

The apparatus described and illustrated herein are examples of simple devices adapted to extract both kinetic and potential energy from the motion of water beneath waves. Other modes of applying the principles of the invention may be employed, provided the features stated in any of the following claims or the equivalent thereof be employed.

What I claim as my invention is:

1. Apparatus for extracting energy from the motion of water beneath waves in a body of water comprising a generally upright sail structure capable of being moved by the water, means for supporting said sail structure in said body of water transverse to the direction of water movement with at least a substantial portion thereof beneath the surface of the waves and for guiding the same for generally rectilinear movement in the direction of water movement so that said structure may be reciprocated by the movement of the water beneath the waves, and means operatively connecting said sail structure to a power device, such as an electric generator or pump, to transfer the energy extracted by said sail structure to said power device.

2. Apparatus for extracting energy from the motion of water beneath waves in a body of water comprising a generally upright sail structure capable of being moved by the water, means for supporting said sail structure in said body of water transverse to the direction of water movement with at least a substantial portion thereof beneath the surface of the waves, said sail structure being pivoted adjacent its lower extremity for oscillation about a generally horizontal axis.

3. Apparatus as defined in claim 1 or 2, including means for turning said sail structure about a vertical axis automatically in response to changes in the direction of water movement so that said sail structure will be disposed transverse to the direction of water movement at all times.

4. Apparatus as defined in claim 1 or 2, wherein said means for operatively connecting said sail structure to a power device comprises a rod connected to and extending generally horizontally from said generally upright sail structure in a direction parallel to the direction of movement thereof.

5. Apparatus for extracting energy from the motion of water beneath waves in a body of water comprising a member capable of being moved by the water, means for supporting said member in said body of water transverse to the direction of water movement with at least a substantial portion thereof beneath the surface of the waves, said member being pivoted for oscillation about a generally horizontal axis, buoyant means associated with said member urging it to an upright position, and means operatively connecting said member to a power device, such as an electric generator or pump, to transfer the energy extracted by said member to said power device.

6. Apparatus as defined in claim 5, wherein said member is a generally upright sail structure.

7. Apparatus for extracting energy from the motion of water beneath waves in a body of water comprising a generally upright sail structure capable of being moved by the water, said sail structure including a sheet of material held by a frame, means for supporting said sail structure in said body of water so that said sheet is disposed transverse to the direction of water movement with at least a portion of said sheet beneath the surface of the waves, and means operatively connecting said sail structure to a power device, such as an electric generator or pump, to transfer the energy extracted by said sail structure to said power device.

8. Apparatus as defined in claim 7, wherein said sheet is flexible and the edges thereof are secured to portions of said frame in a manner such that said sheet may move alternately in one direction and the other in response to reversal of water movement.

9. Apparatus as defined in claim 7, wherein opposite edges of said sheet are secured to laterally spaced upright members of said frame.

10. Apparatus as defined in claim 7, wherein edges of said sheet are secured to vertically spaced members of said frame.

11. Apparatus as defined in claim 7, wherein said means operatively connecting said sail structure to a power device comprises a rod connected to and extending generally horizontally from said generally upright sail structure in a direction parallel to the direction of movement thereof.

12. Apparatus for extracting energy from the motion of water beneath waves in a body of water comprising a member capable of being moved by the water, means for supporting said member in said body of water transverse to the direction of water movement with at least a substantial portion thereof beneath the surface of the waves, an electric generator, means connecting said member to said generator to transfer energy extracted by said member to said generator, and means for restraining said member from movement in either direction beyond predetermined limits comprising means for changing the generator field in response to movements of said member beyond said predetermined limits.

13. Apparatus for extracting energy from the motion of water beneath waves in a body of water comprising a sail structure capable of being moved by the water, said sail structure including a plurality of sheets held by a frame, means for supporting said sail structure in said body of water so that said sheets are disposed transverse to the direction of water movement with at least a portion of said sail structure beneath the surface of the waves, and means operatively connecting said sail structure to a power device, such as an electric generator or pump, to transfer the energy extracted by said sail structure to said power device.

14. Apparatus as defined in claim 13, wherein said sheets are flexible.

15. Apparatus as defined in claim 13, wherein said sheets are supported in side-by-side relation to one another.

16. Apparatus as defined in claim 13, wherein said sheets are supported one above another.

17. A method for extracting energy from the motion of water beneath waves in a body of water comprising supporting a sail structure in said body of water transverse to the direction of water movement and with at least a substantial portion thereof beneath the surface of the waves, guiding said sail structure for generally rectilinear movement in the direction of water movement so that said sail structure may be reciprocated by the reciprocatory movement of the water beneath the waves, and operatively connecting said sail structure to a power device, such as an electric motor or pump, to transfer the energy extracted by said sail structure to said power device.

18. A method for extracting energy from the motion of water beneath waves in a body of water comprising providing a sail structure capable of being moved by the water, supporting said sail structure generally upright in said body of water transverse to the direction of water movement with at least a substantial portion thereof beneath the surface of the waves for pivotal movement about a horizontal axis adjacent its lower extremity to enable said sail structure to be oscillated by the movement of the water, and operatively connecting said sail structure to a power device, such as an electric motor or pump, to transfer the energy extracted by said sail structure to said power device.

19. A method for extracting energy from the motion of water beneath waves in a body of water comprising supporting a sail structure in said body of water disposed transversely of the direction of water movement and with at least a substantial portion thereof beneath the surface of the waves, supporting said sail structure for back and forth movement by the water, and operatively connecting said sail structure to a power device, such as an electric motor or pump, to transfer the energy extracted by said sail structure to said power device.

* * * * *